US008369877B2

(12) United States Patent
Nonaka

(10) Patent No.: US 8,369,877 B2
(45) Date of Patent: Feb. 5, 2013

(54) IMAGE COMMUNICATION SYSTEM, IMAGE SERVER, METHOD OF CONTROLLING OPERATION THEREOF AND MEDIUM STORING COMPUTER PROGRAM FOR CONTROLLING OPERATION THEREOF

(75) Inventor: Shunichiro Nonaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 48 days.

(21) Appl. No.: 12/962,517

(22) Filed: Dec. 7, 2010

(65) Prior Publication Data

US 2011/0159896 A1 Jun. 30, 2011

(30) Foreign Application Priority Data

Dec. 25, 2009 (JP) ................................ 2009-294438

(51) Int. Cl.
*H04W 4/12* (2009.01)

(52) U.S. Cl. .................... 455/466; 455/566; 455/412.1; 455/414.2; 455/411; 345/629; 345/649; 345/684; 345/173; 345/661

(58) Field of Classification Search ................. 455/466, 455/566, 412, 418, 414.1, 411; 345/629, 345/649, 684, 538, 661, 173
See application file for complete search history.

(56) References Cited

U.S. PATENT DOCUMENTS

2005/0250548 A1* 11/2005 White .......................... 455/566
2010/0083167 A1* 4/2010 Kikuchi et al. ............... 715/786
2011/0084982 A1* 4/2011 Mihalov et al. ............... 345/629

FOREIGN PATENT DOCUMENTS

JP 2001-86318 A 3/2001
JP 2009-86482 A 4/2009

* cited by examiner

*Primary Examiner* — Kiet Doan
*Assistant Examiner* — Michael T Vu
(74) *Attorney, Agent, or Firm* — McGinn IP Law Group, PLLC

(57) ABSTRACT

Viewing of a scrolled image on a display screen is facilitated. Assume that a first image portion (81) is being displayed on the display screen of a mobile telephone and that a second image portion (82) is not being displayed on the screen. If scrolling is performed rightward in order to display the second image portion (82) on the display screen, data representing the scrolling direction and scrolling amount is transmitted from the mobile telephone to an image server. The image server rotates the second image portion (82) in accordance with the scrolling direction, reads the rotated second image portion (82) block by block and transmits the resultant image data to the mobile telephone block by block. The mobile telephone rotates the block images reversely through the angle of the original rotation and displays the blocks in order. The second image portion (82), which was not being displayed on the display screen, is displayed along the scrolling direction from the portion contiguous to the edge, in terms of the scrolling direction, of the first image portion (81) that is being displayed on the display screen.

9 Claims, 14 Drawing Sheets

IMAGE COMMUNICATION SYSTEM, IMAGE SERVER, METHOD OF CONTROLLING OPERATION THEREOF AND MEDIUM STORING COMPUTER PROGRAM FOR CONTROLLING OPERATION THEREOF

BACKGROUND OF THE INVENTION

1. Field of the Invention

This invention relates to an image communication system, an image server, a method of controlling operation of the image server and a medium storing a computer program for controlling the operation of the image server.

2. Description of the Related Art

It is possible to communicate with an image server and display an image, which is represented by image data transmitted from the image server, on the display screen of a mobile telephone. If the image is large, the image is reduced in size so as to fit the size of the display screen because the display screen of a mobile telephone is comparatively small. When the image is reduced in size, the displayed image becomes difficult to view. In order to deal with this, there is a technique whereby part of the image is displayed on the display screen and the remainder of the image is displayed based upon image data transmitted from the image server to the mobile telephone in accordance with a scrolling operation performed by the user (see the specification of Japanese Patent Application Laid-Open No. 2009-86482). Usually, however, the image data transmitted from the image server to the mobile telephone is image data that has been compressed. In general, this compression is based upon the JPEG (Joint Photographic Experts Group) scheme (see the specification of Japanese Patent Application Laid-Open No. 2001-86318). With JPEG-based compression, image data is compressed in a prescribed order block by block, where each block is composed of a plurality of pixels, and the image data is expanded in the prescribed order. Depending upon the scrolling direction, the order of the remaining image portions displayed and the scrolling direction may not coincide owing to expansion. Even if scrolling is performed, therefore, locations where no image exists arise and viewing becomes difficult.

SUMMARY OF THE INVENTION

An object of the present invention is to facilitate viewing of an image even when the image is scrolled.

A first aspect of the present invention provides an image communication system comprising a mobile telephone, which has a display device formed to have a display screen, and an image server.

The mobile telephone has an image request data transmitting device (means) for transmitting image request data, which requests an image to be displayed on the display screen, to the image server, and the image server has a main image portion data transmitting device (means) for reading, from within a requested image requested by the image request data transmitted from the image request data transmitting device of the mobile telephone, a first image portion of an area, which is displayable on the display screen, in a prescribed order block by block, where each block is composed of a plurality of pixels, and transmitting first image portion data representing the first image portion to the mobile telephone in the order of the read blocks.

The mobile telephone includes: a first display control device (means) for controlling the display device in such a manner that the first image portion, which is represented by the first image portion data transmitted from the main image portion data transmitting device of the image server, is displayed on the display screen; a scroll input device (means) for inputting a scrolling direction and scrolling amount of the first image portion being displayed on the display screen; and a scrolling data transmitting device (means) for transmitting scrolling direction data and scrolling amount data representing the scrolling direction and scrolling amount, respectively, that have been input from the scroll input device, to the image server.

The image server further includes: a rotation angle deciding device (means) for deciding a rotation angle of a second image portion, which is the requested image minus the first image portion, based upon the scrolling direction represented by the scrolling direction data transmitted from the scrolling data transmitting device of the mobile telephone; a rotating device (means) for rotating the second image portion through the rotation angle decided by the rotation angle deciding device; and a scroll image portion data transmitting device (means) for reading a scroll image portion (which may be identical with the second image portion) corresponding to the scrolling amount, which is represented by the scrolling amount data of the mobile telephone, in the prescribed order block by block from within the second image portion that has been rotated by the rotating device, and transmitting scroll image portion data representing the scroll image portion to the mobile telephone in the order of the read blocks.

The mobile telephone further includes a second display control device (means) for controlling the display device in such a manner that the scroll image portion, which is represented by the scroll image portion data transmitted from the scroll image portion data transmitting device of the image server, is rotated reversely through the rotation angle decided by the rotation angle deciding device of the image server and is displayed at an edge portion of the display screen (block by block) in terms of the scrolling direction that has been input from the scroll input device of the mobile telephone.

In accordance with the first aspect of the present invention, image request data is transmitted from a mobile telephone to an image server. From within a requested image requested by the image request data, a first image portion displayable on the display screen of the mobile telephone is read in a prescribed order block by block, where each block is composed of a plurality of pixels. First image portion data representing the first image portion is transmitted from the image server to the mobile telephone in the order of the read blocks. When the first image portion data is received by the mobile telephone, the first image portion represented by the first image portion data received is displayed on the display screen of the mobile telephone. When scrolling is performed by the user of the mobile telephone, scrolling direction data representing the scrolling direction and scrolling amount data representing the scrolling amount is transmitted from the mobile telephone to the image server.

At the image server, a rotation angle of a second image portion, which is the requested image minus the first image portion, is decided based upon the scrolling direction. The second image portion is rotated through the rotation angle decided. From within the second image portion that has been rotated, a scroll image portion corresponding to the scrolling amount is read in a prescribed order block by block, and scroll image portion data representing the scroll image portion is transmitted from the image server to the mobile telephone in the order of the read blocks. When the scroll image portion data is received by the mobile telephone, the scroll image portion represented by the scroll image portion data is rotated reversely through the rotation angle decided and is displayed at an edge portion of the display screen in the scrolling direction.

In accordance with the first aspect of the present invention, after the second image portion is rotated in accordance with the direction of scrolling performed by the user, it is read block by block by the image server. The second image portion is then rotated reversely by the mobile telephone in accordance with the rotation angle and the scroll image portion is displayed by the mobile telephone. As a result, the scroll image portion is displayed along the scrolling direction from the edge portion of the display screen in terms of the scrolling direction. Thus the image is easy to view.

By way of example, the rotation angle deciding device of the image server decides upon 90° as the rotation angle of the second image portion in a case where the scrolling direction represented by the scrolling direction data transmitted from the scrolling data transmitting device of the mobile telephone is rightward; decides upon 180° as the rotation angle of the second image portion in a case where the scrolling direction represented by the scrolling direction data transmitted from the scrolling data transmitting device of the mobile telephone is upward; decides upon 270° as the rotation angle of the second image portion in a case where the scrolling direction represented by the scrolling direction data transmitted from the scrolling data transmitting device of the mobile telephone is leftward; and decides upon 0° as the rotation angle of the second image portion in a case where the scrolling direction represented by the scrolling direction data transmitted from the scrolling data transmitting device of the mobile telephone is downward.

The first aspect of the present invention also provides an image server constituting the above-described image communication system. Specifically, the present invention provides an image server comprising: a main image portion data transmitting device (means) for reading, from within a requested image requested by image request data transmitted from a mobile telephone having a display device formed to include a display screen, a first image portion of an area, which is displayable on the display screen, in a prescribed order block by block, where each block is composed of a plurality of pixels, and transmitting first image portion data representing the first image portion to the mobile telephone in the order of the read blocks; a rotation angle deciding device (means) for deciding a rotation angle of a second image portion, which is the requested image minus the first image portion, based upon a scrolling direction represented by scrolling direction data representing a scrolling direction transmitted from the mobile telephone; a rotating device (means) for rotating the second image portion through the rotation angle decided by the rotation angle deciding device; and a scroll image portion data transmitting device (means) for reading a scroll image portion corresponding to a scrolling amount, which is represented by scrolling amount data of the mobile telephone, in the prescribed order block by block from within the second image portion that has been rotated by the rotating device, and transmitting scroll image portion data representing the scroll image portion to the mobile telephone in the order of the read blocks.

The first aspect of the present invention also provides an operation control method suited to the above-described image server. Specifically, the first aspect of the present invention provides a method of controlling the operation of an image server, comprising the steps of: reading, from within a requested image requested by image request data transmitted from a mobile telephone having a display device formed to include a display screen, a first image portion of an area, which is displayable on the display screen, in a prescribed order block by block, where each block is composed of a plurality of pixels, and transmitting first image portion data representing the first image portion to the mobile telephone in the order of the read blocks; deciding a rotation angle of a second image portion, which is the requested image minus the first image portion, based upon a scrolling direction represented by scrolling direction data representing a scrolling direction transmitted from the mobile telephone; rotating the second image portion through the rotation angle decided; and reading a scroll image portion corresponding to a scrolling amount, which is represented by scrolling amount data of the mobile telephone, in the prescribed order block by block from within the second image portion that has been rotated, and transmitting scroll image portion data representing the scroll image portion to the mobile telephone in the order of the read blocks.

The first aspect of the present invention further provides a medium storing a program for implementing the above-described method of controlling operation of an image server. The medium includes such media as a magnetic recording medium, optical disk and semiconductor memory.

A second aspect of the present invention provides an image communication system comprising a mobile telephone, which has a display device formed to have a display screen, and an image server.

The mobile telephone has an image request data transmitting device (means) for transmitting image request data, which requests an image to be displayed on the display screen, to the image server, and the image server has a main image portion data transmitting device (means) for reading, from within a requested image requested by the image request data transmitted from the image request data transmitting device of the mobile telephone, a first image portion of an area, which is displayable on the display screen, in a prescribed order block by block, where each block is composed of a plurality of pixels, and transmitting first image portion data representing the first image portion to the mobile telephone in the order of the read blocks.

The mobile telephone includes: a first display control device (means) for controlling the display device in such a manner that the first image portion, which is represented by the first image portion data transmitted from the main image portion data transmitting device of the image server, is displayed on the display screen; a scroll input device (means) for inputting a scrolling direction and scrolling amount of the first image portion being displayed on the display screen; and a scrolling data transmitting device (means) for transmitting scrolling direction data and scrolling amount data representing the scrolling direction and scrolling amount, respectively, that have been input from the scroll input device, to the image server.

The image server further includes: a reading order deciding device (means) for deciding, based upon the scrolling direction represented by the scrolling direction data transmitted from the scrolling data transmitting device of the mobile telephone, the reading order of the blocks of a scroll image portion corresponding to the scrolling amount represented by the scrolling amount data of the mobile telephone; and a scroll image portion transmitting device (means) for transmitting scroll image portion data, which represents the scroll image portion, to the mobile telephone block by block in the order decided by the reading order deciding device.

The mobile telephone further includes a second display control device (means) for controlling the display device in such a manner that the scroll image portion, which is represented by the scroll image portion data transmitted from the scroll image portion data transmitting device of the image server, is displayed at an edge portion of the display screen (block by block) in terms of the scrolling direction that has been input from the scroll input device of the mobile telephone in the order corresponding to the reading order decided by the reading order deciding device of the image server.

In the second aspect of the present invention also, in a manner similar to that of the first aspect, image request data is transmitted from a mobile telephone to an image server. From within a requested image requested by the image request data, a first image portion displayable on the display screen of the mobile telephone is read in a prescribed order block by block, where each block is composed of a plurality of pixels. First image portion data representing the first image portion is transmitted from the image server to the mobile telephone in the order of the read blocks. When the first image portion data is received by the mobile telephone, the first image portion represented by the first image portion data received is displayed on the display screen of the mobile telephone. When scrolling is performed by the user of the mobile telephone, scrolling direction data representing the scrolling direction and scrolling amount data representing the scrolling amount is transmitted from the mobile telephone to the image server.

At the image server, the block-by-block reading order of the scroll image portion is decided based upon the scrolling direction. Scroll image portion data representing the scroll image portion is transmitted from the image server to the mobile telephone block by block in the reading order decided. When the scroll image portion data is received by the mobile telephone, the scroll image portion data is displayed at the edge portion of the display screen in terms of the scrolling direction block by block in an order corresponding to the reading order decided.

In the second aspect of the present invention, the scroll image portion is read block by block in an order corresponding to the direction of scrolling performed by the user, and the scroll image portion data representing the scroll image portion is transmitted from the image server to the mobile telephone block by block. As a result, the scroll image portion is displayed along the scrolling direction from the edge portion of the display screen in terms of the scrolling direction. Thus the image is easy to view.

The block-by-block reading of the first image portion in the prescribed order performed by the main image portion data transmitting device is carried out block by block in such a manner that reading moves rightward from the upper left of the first image portion and downward in turn. In this case, by way of example, the reading order deciding device of the image server decides reading block by block in such a manner that reading moves downward from the upper left of the scroll image portion and rightward in turn in a case where the scrolling direction represented by the scrolling direction data transmitted from the scrolling data transmitting device of the mobile telephone is rightward; decides reading block by block in such a manner that reading moves downward from the upper right of the scroll image portion and leftward in turn in a case where the scrolling direction represented by the scrolling direction data transmitted from the scrolling data transmitting device of the mobile telephone is leftward; decides reading block by block in such a manner that reading moves rightward from the lower left of the scroll image portion and upward in turn in a case where the scrolling direction represented by the scrolling direction data transmitted from the scrolling data transmitting device of the mobile telephone is upward; and decides reading block by block in an order identical with the prescribed order in a case where the scrolling direction represented by the scrolling direction data transmitted from the scrolling data transmitting device of the mobile telephone is downward.

The second aspect of the present invention also provides an image server constituting the above-described image communication system. Specifically, the present invention provides an image server comprising: a main image portion data transmitting device (means) for reading, from within a requested image requested by image request data transmitted from a mobile telephone having a display device formed to include a display screen, a first image portion of an area, which is displayable on the display screen, in a prescribed order block by block, where each block is composed of a plurality of pixels, and transmitting first image portion data representing the first image portion to the mobile telephone in the order of the read blocks; a reading order deciding device (means) for deciding, based upon a scrolling direction represented by scrolling direction data transmitted from the mobile telephone, the reading order of the blocks of a scroll image portion corresponding to the scrolling amount represented by scrolling amount data of the mobile telephone; and a scroll image portion transmitting device (means) for transmitting scroll image portion data, which represents the scroll image portion, to the mobile telephone block by block in the order decided by the reading order deciding device.

The second aspect of the present invention also provides an operation control method suited to the above-described image server. Specifically, the second aspect of the present invention provides a method of controlling the operation of an image server, comprising the steps of: reading, from within a requested image requested by image request data transmitted from a mobile telephone having a display device formed to include a display screen, a first image portion of an area, which is displayable on the display screen, in a prescribed order block by block, where each block is composed of a plurality of pixels, and transmitting first image portion data representing the first image portion to the mobile telephone in the order of the read blocks; deciding, based upon a scrolling direction represented by scrolling direction data transmitted from the mobile telephone, the reading order of the blocks of a scroll image portion corresponding to a scrolling amount represented by scrolling amount data of the mobile telephone; and transmitting scroll image portion data, which represents the scroll image portion, to the mobile telephone block by block in the order decided.

The second aspect of the present invention further provides a medium storing a program for implementing the above-described method of controlling operation of an image server.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described with reference to the drawings.

Figure 1:
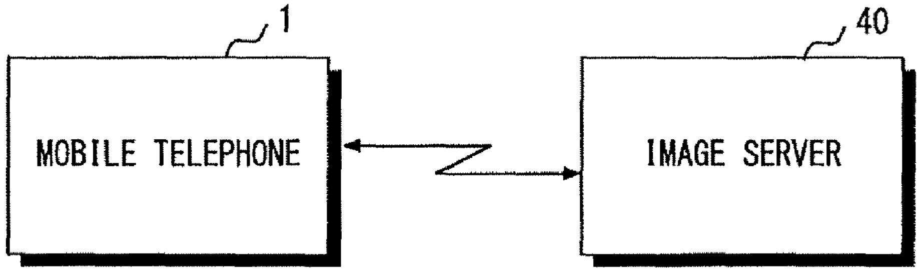
FIG. 1 illustrates an overview of an image communication system.

FIG. 1 is an overview of an image communication system according to an embodiment of the present invention.

The image communication system according to this embodiment includes a mobile telephone 1 and an image server 40, which are capable of communicating with each other. Although the mobile telephone 1 and image server 40 are illustrated as communicating directly in FIG. 1, communication may be achieved via a network such as the Internet rather than directly. In this embodiment, image data is transmitted from the image server 40 in response to a request from the mobile telephone 1. The image represented by this image data is displayed on the display screen of the mobile telephone 1.

Although only one mobile telephone 1 and one image server 40 are illustrated in FIG. 1, the image communication system may include a plurality of the mobile telephones 1 or a plurality of the image servers 40.

Figure 2:
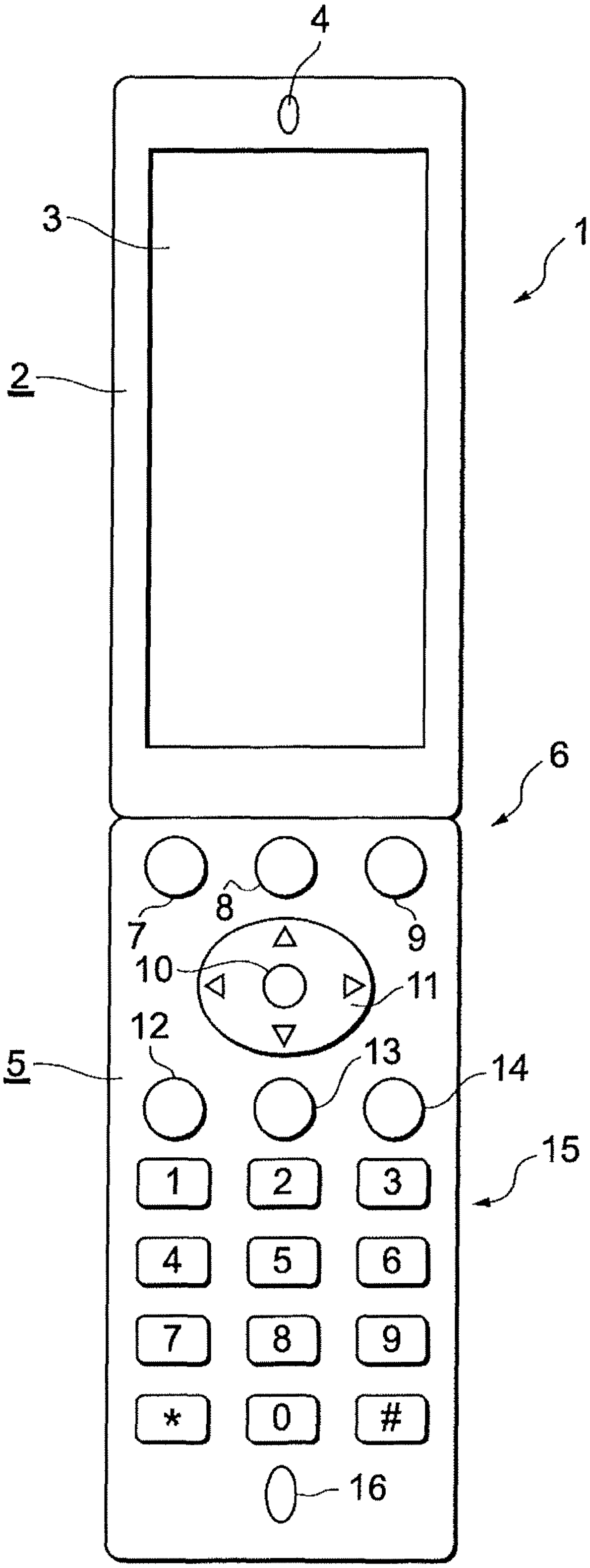
FIG. 2 is a front view of a mobile telephone.

FIG. 2 is a front view of the mobile telephone 1.

The mobile telephone 1, which is of the clam-shall type (although it need necessarily be of the clam-shell type), has a first-half body 2 and a second-half body 5.

The upper portion of the first-half body 2 is provided with a speaker 4, and a display screen 3 is formed over the entire surface of the first-half body 2. An image represented by image data transmitted from the image server 40 is displayed on the display screen 3, as mentioned above.

The second-half body 5 is provided with a keypad 6. The keypad 6 includes a telephone directory button 7, a setting button 8, a menu button 9, an enter button 10, an annular arrow button 11 on which up, down, left and right arrows have been formed, a call button 12, a clear button 13, a power source on/off button 14 and buttons 15 on which numerals 0 to 9, an asterisk symbol and a sharp symbol have been formed. A microphone 16 is formed below the keypad 6.

Since the display screen 3 of the mobile telephone 1 is comparatively small, there are instances where one full frame of an image cannot be displayed on the screen. In such cases the up, down, left and right arrows of the arrow button 11 are pressed, thereby scrolling up, down, left and right the image being displayed on the display screen 3 so that portions of the image not being displayed on the display screen 3 can be displayed on the display screen 3.

Figure 3:
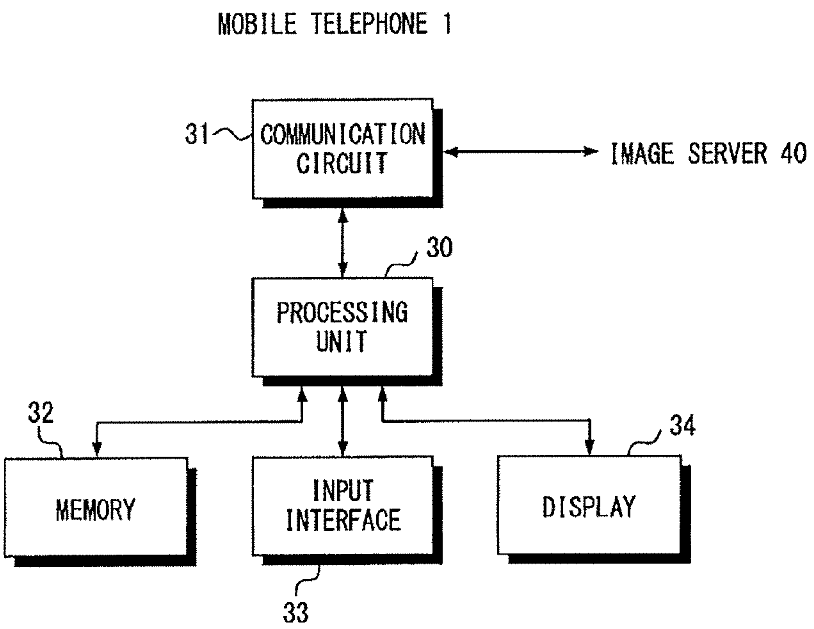
FIG. 3 is a block diagram illustrating the electrical configuration of a mobile telephone.

FIG. 3 is a block diagram illustrating the electrical configuration of the mobile telephone 1.

The overall operation of the mobile telephone 1 is controlled by a processing unit 30.

The mobile telephone 1 includes a communication circuit 31 for communicating with the image server 40. The mobile telephone 1 further includes a memory 32 storing a browser for displaying an image, other programs and data, an input interface 33 for applying commands from the keypad 6 to the processing unit 30, and a display unit 34. Although the mobile telephone 1 also has a conversation function, the conversation-related circuitry is not shown.

Figure 4:
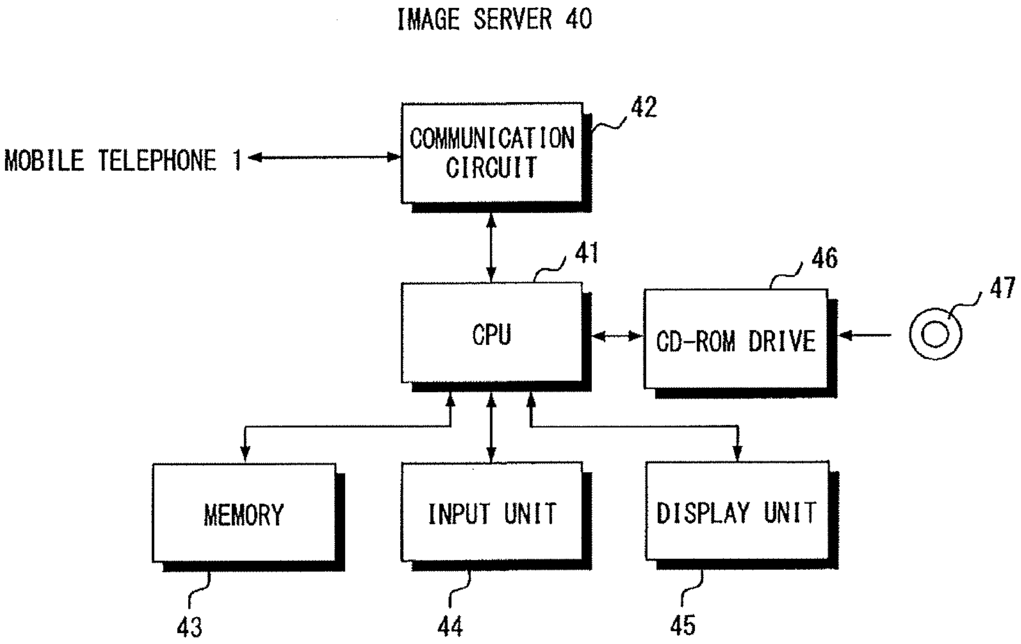
FIG. 4 is a block diagram illustrating the electrical configuration of an image server.

FIG. 4 is a block diagram illustrating the electrical configuration of the image server 40.

The overall operation of the image server 40 is controlled by a CPU 41.

The image server 40 includes a communication circuit 42 for communicating with the mobile telephone 1. The image server 40 further includes a CD-ROM (Compact Disk-Read-Only Memory) drive 46. An operation program that has been stored on a CD-ROM 47 is read by the CD-ROM drive 46 and an operation, described later, is performed by installing the program in the image server 40. Naturally, the recording medium (which may or may not be removably inserted into the image server 40) storing the operation program is not limited to the CD-ROM 47 and may be another recording medium. The operation program may also just as well be pre-installed. Further, the operation program transmitted via the network may be received by the image server 40 and then installed in the image server 40.

The image server 40 further includes a memory 43 for storing the above-mentioned operation program and other data, an input unit 44 such as a keyboard and mouse, and a display unit 45.

Figure 5:
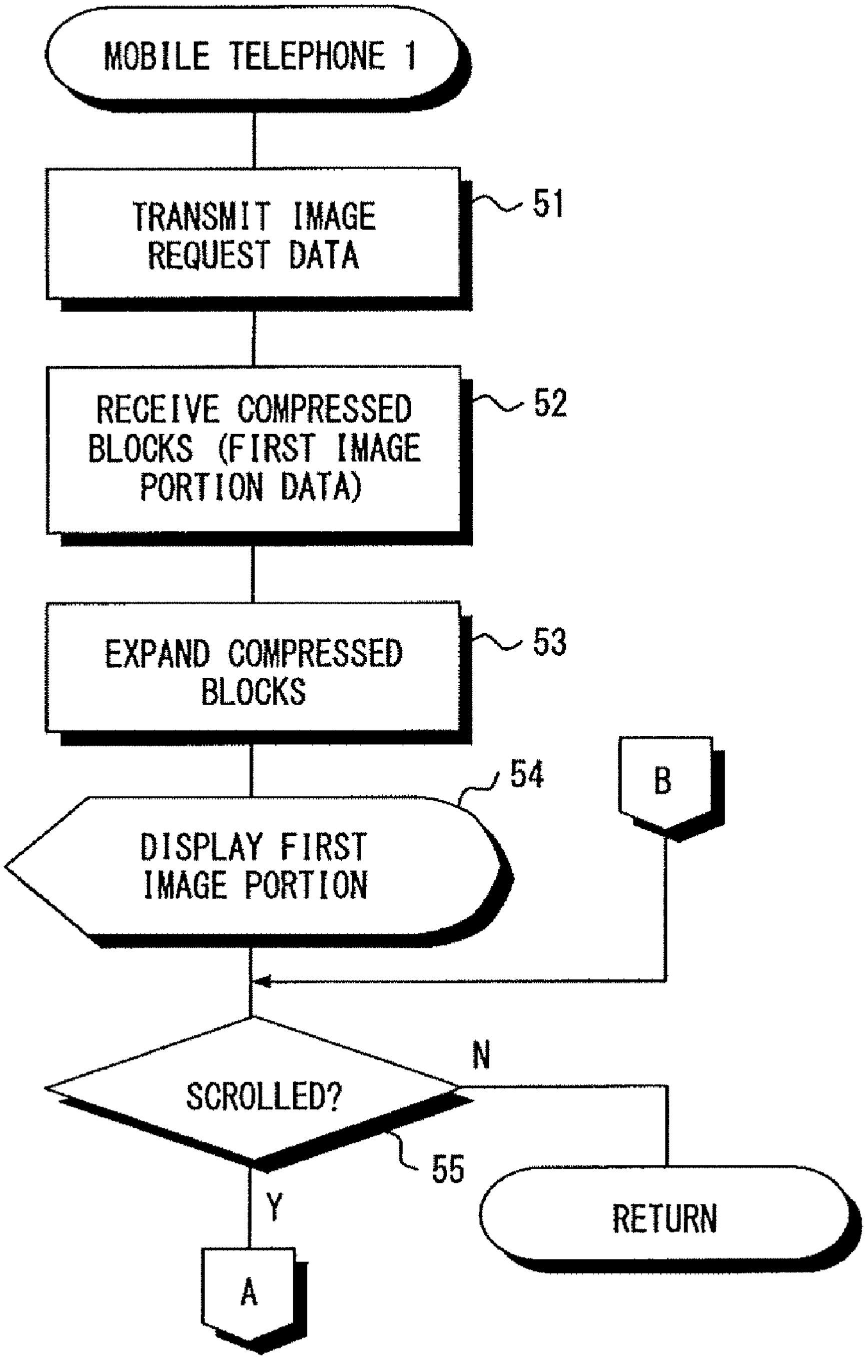
FIG. 5 is a flowchart illustrating processing executed by a mobile telephone.
Figure 6:
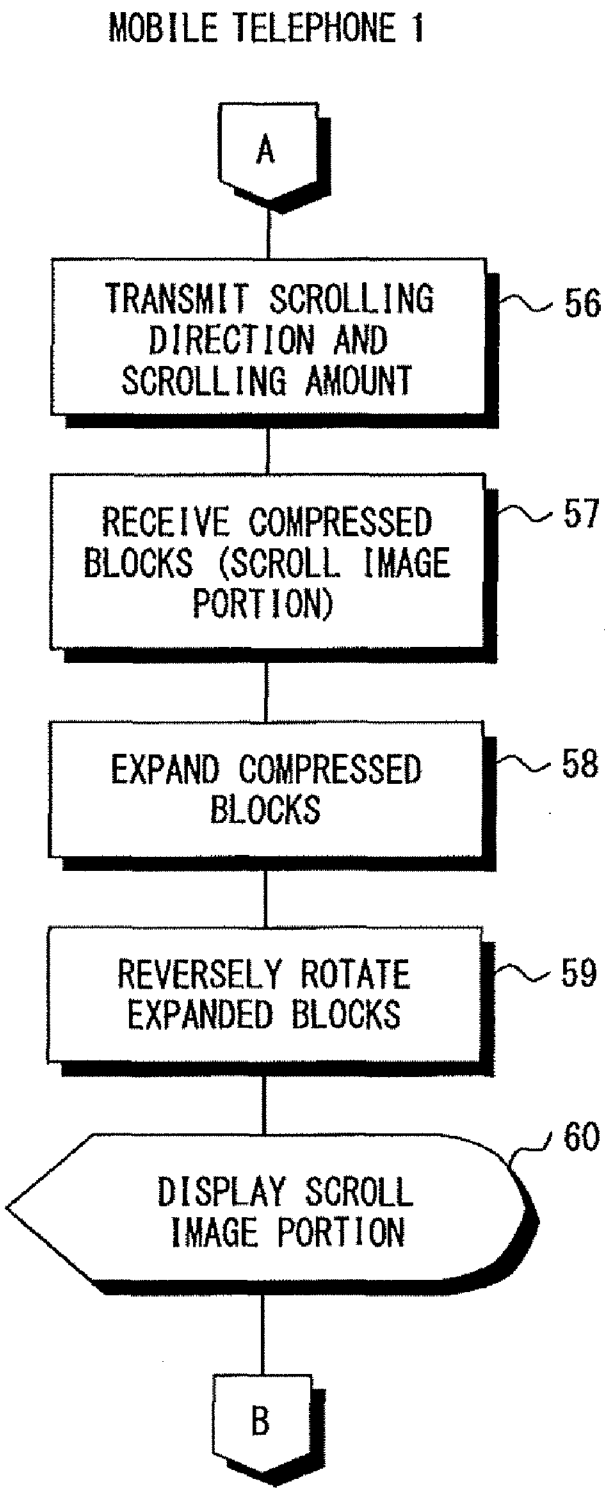
FIG. 6 is a flowchart illustrating processing executed by a mobile telephone.
Figure 7:
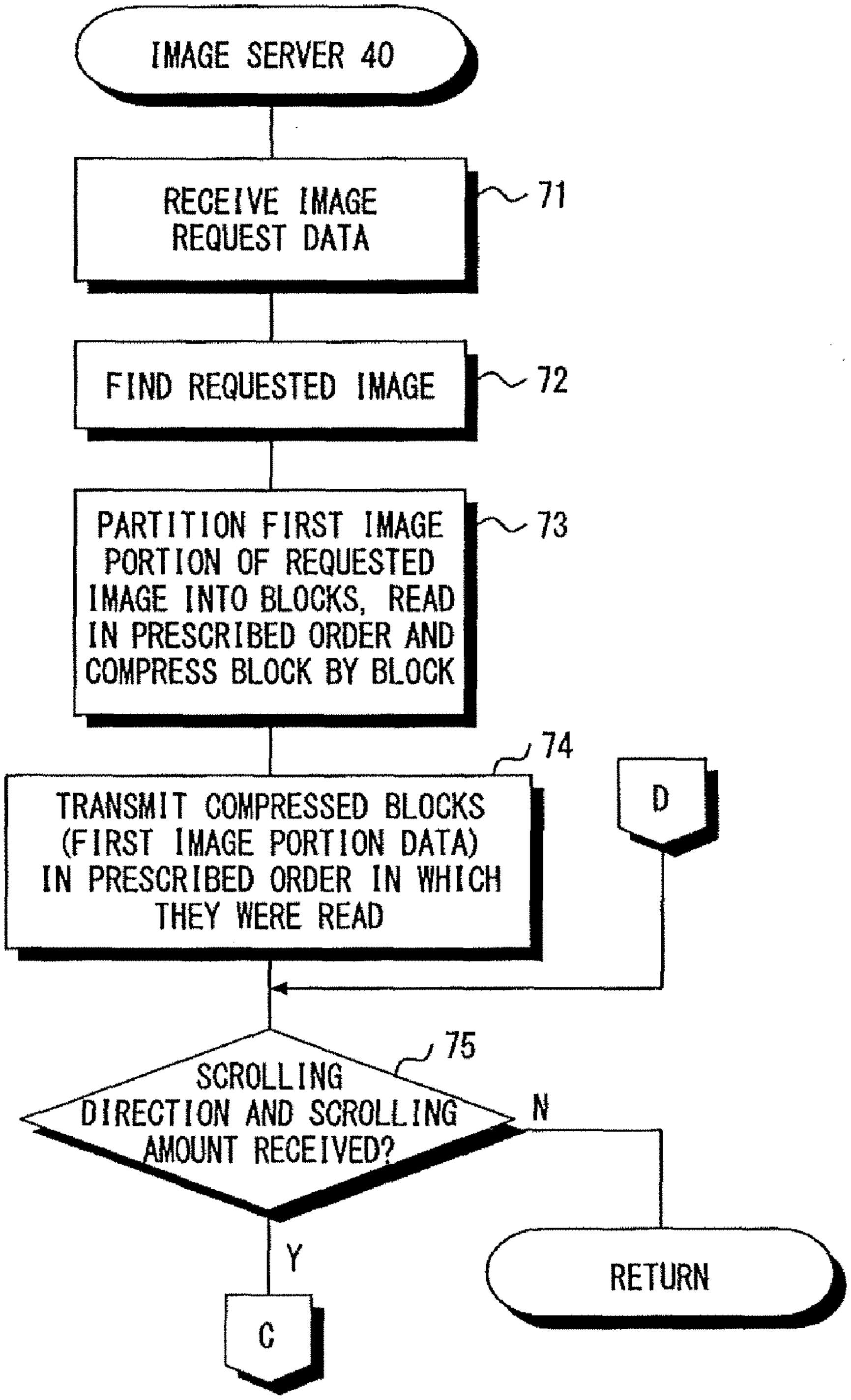
FIG. 7 is a flowchart illustrating processing executed by an image server.
Figure 8:
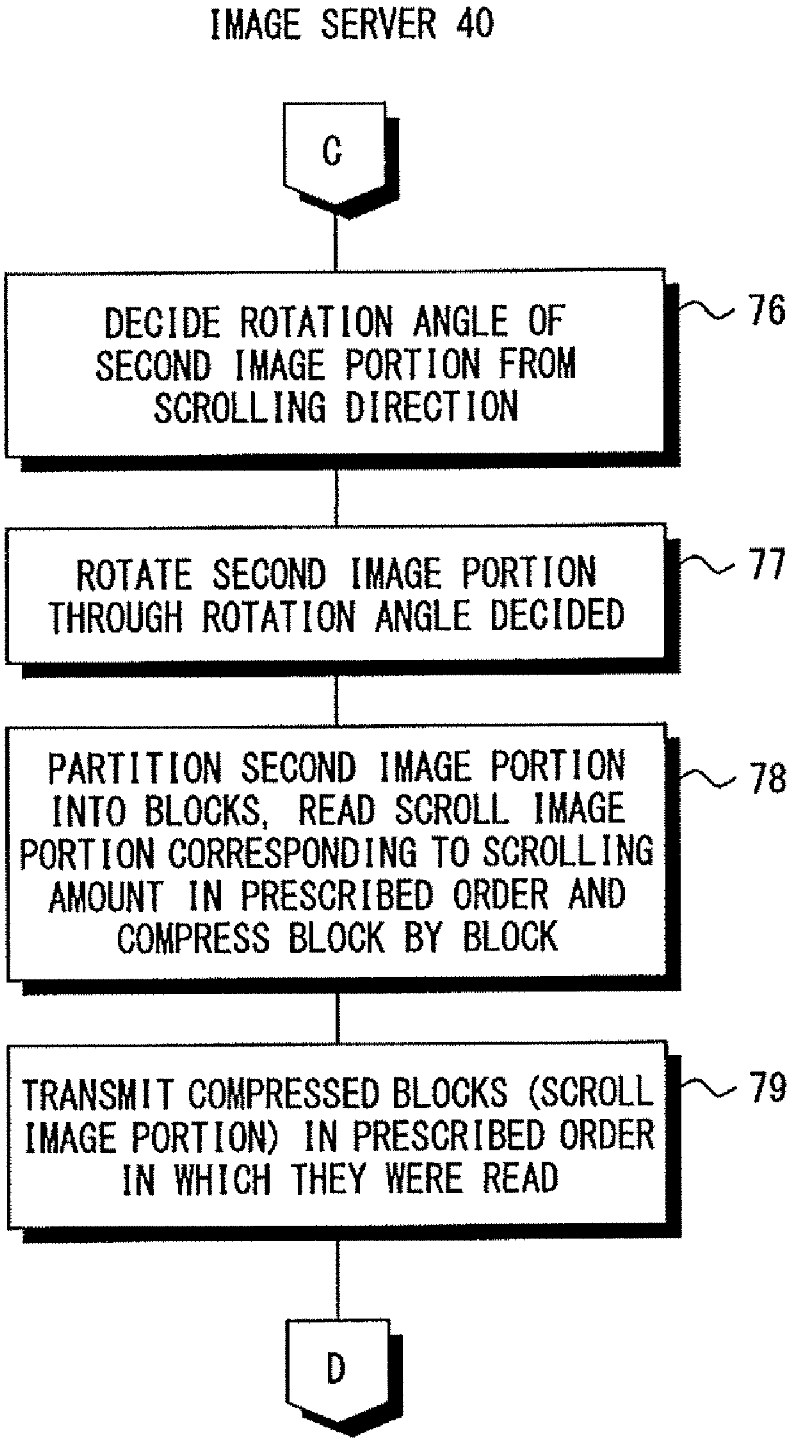
FIG. 8 is a flowchart illustrating processing executed by an image server.

FIGS. 5 and 6 are flowcharts illustrating processing executed by the mobile telephone 1, and FIGS. 7 and 8 are flowcharts illustrating processing executed by the image server 40.

In this embodiment, an image represented by image data transmitted from the image server 40 in response to a request from the mobile telephone 1 is displayed on the display screen 3 of mobile telephone 1. If there is a portion of the image that cannot be displayed on the display screen 3 of mobile telephone 1, the image is scrolled using the arrow button 11 in the manner described above. This embodiment is such that if the image is scrolled, a part of the portion of the image not being displayed comes into view from the image portion adjacent the edge portion of the image in the direction of scrolling.

When communication is established between the mobile telephone 1 and image server 40, an address at which desired image data has been stored is input using the keypad 6 of mobile telephone 1. Data representing this address is transmitted from the mobile telephone 1 to the image server 40 as image request data (step 51 in FIG. 5). Naturally, it may be so arranged that image specifying data such as a file name specifying a desired image and image request data requesting an image is transmitted from the mobile telephone 1 to the image server 40.

Upon receiving the image request data transmitted from the mobile telephone 1 (step 71 in FIG. 7), the image server 40 finds image data representing the requested image from the image data that has been stored in the memory (or external storage device) (step 72 in FIG. 7).

Figure 9:
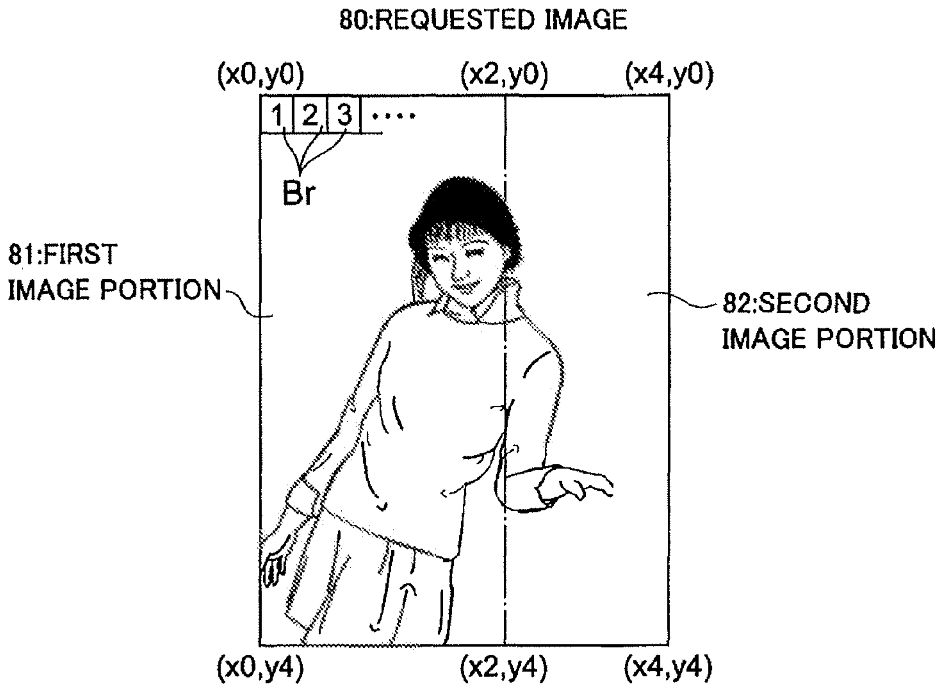
FIG. 9 is an example of an image.

FIG. 9 is an example of an image (requested image 80) requested by the user of the mobile telephone 1.

The requested image 80 has a size delimited by coordinates (x0,y0), (x4,y0), (x0,y4) and (x4,y4). Since the size of the display screen 3 of mobile telephone 1 is comparatively small, the entirety of the requested image 80 cannot be displayed. A first image portion 81 of the requested image 80, namely an image portion 81 delimited by coordinates (x0,y0), (x2,y0), (x0,y4) and (x2,y4), is displayed on the display screen 3 of mobile telephone 1. A second image portion 82 of the requested image 80, namely an image portion 82 [delimited by coordinates (x2,y0), (x4,y0), (x2,y4) and (x4,y4)] of the requested image 80 from which the first image portion 81 has been excluded, is an image portion not displayed in a case where the first image portion 81 is being displayed on the display screen 3 of mobile telephone 1.

In this embodiment, the image is partitioned into a multiplicity of blocks Br each comprising an array of 8×8 pixels. The multiplicity of blocks obtained by such partitioning are read in the rightward direction in turn starting from the upper left. When one row of blocks Br has been read, reading is shifted downward by one row (the numerals shown in the respective blocks Br indicate the order in which the blocks are read). Whenever one block Br is read, the image data of the portion of the image contained in the block Br is compressed. The compressed image data is transmitted from the image server 40 to the mobile telephone 1 in order one block at a time.

With reference again to FIG. 7, the first image portion 81 of the requested image 80 is partitioned into a multiplicity blocks, the first image portion 81 is read block by block in a prescribed order and is compressed block by block (step 73 in FIG. 7). The compressed image data (first image portion data) is transmitted from the image server 40 to the mobile telephone 1 block by block (step 74 in FIG. 7). The compressed image data is transmitted from the image server 40 to the mobile telephone 1 in accordance with the order of the blocks read from the first image portion 81.

The compressed image data (first image portion data) transmitted from the image server 40 is received by the mobile telephone 1 block by block (step 52 in FIG. 5). The mobile telephone 1 then proceeds to expand the compressed image data one block at a time (step 53 in FIG. 5). The expanded image data is applied to the display unit 34, whereby the first mage portion 81 is displayed on the display screen 3 of display unit 34 (step 54 in FIG. 5).

Figure 10:
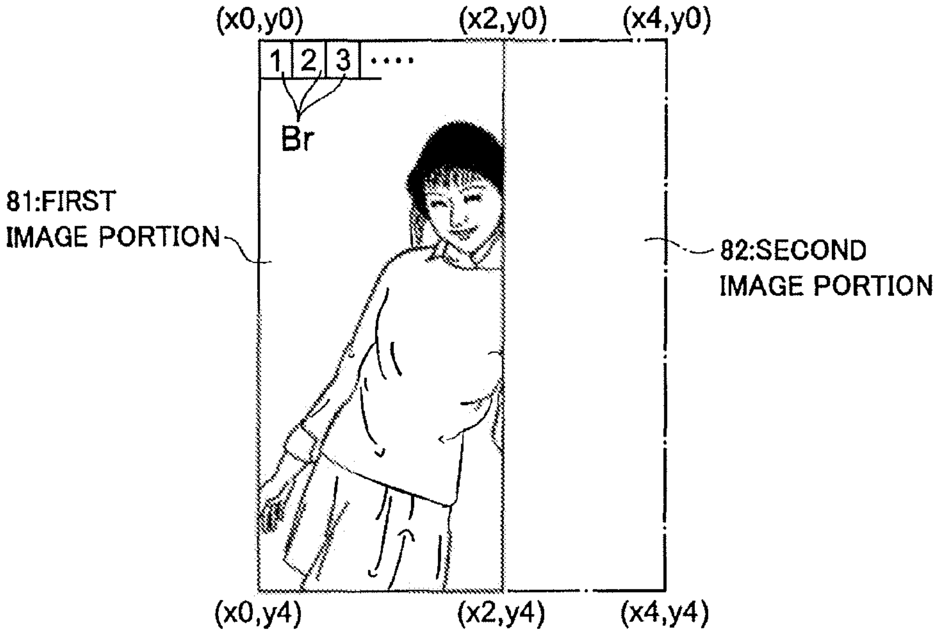
FIG. 10 is an example of an image.

FIG. 10 illustrates the first image portion 81 being displayed on the display screen 3 of mobile telephone 1.

The image being displayed on the display screen 3 is the first image portion 81, which is the requested image 80 with the exception of the second image portion 82. The first image portion 81 is displayed block by block Br in an order corresponding to the order of the blocks read in the image server 40 as described above (the numerals shown in the respective blocks indicate the order in which the blocks are displayed). This embodiment is such that if the first image portion 81 has been partitioned into the multiplicity of blocks Br in the image server 40, the order in which the blocks are read moves rightward from the upper left and downward one row at a time. Accordingly, the block-by-block display order also moves rightward from the upper left and downward one row at a time in a similar manner. The first image portion 81 thus is displayed from the top down in order.

The first image portion 81 is being displayed on the display screen 3 but the second image portion 82 to the right of the first image portion 81 is not. In order to display the second image portion 82 on the display screen 3, the right arrow on the arrow button 11 is pressed by the user of the mobile telephone 1. When this is done, a scroll-direction command for rightward scrolling is applied to the mobile telephone 1. Further, a scroll-amount command conforming to the length of time the arrow button 11 is pressed (or the number of times the arrow button 11 is pressed) is applied to the mobile telephone 1.

With reference again to FIG. 5, whether scrolling has been performed is determined (step 55). If scrolling is performed ("YES" at step 55 in FIG. 5), scrolling direction data representing the scrolling direction and scrolling amount data representing the amount of scrolling is transmitted from the mobile telephone 1 to the image server 40 (step 56 in FIG. 6).

When the scrolling direction data and scrolling amount data transmitted from the mobile telephone 1 is received by the image server 40 ("YES" at step 75 in FIG. 7), the rotation angle of the second image portion 82 not being transmitted to the mobile telephone 1 is decided (step 76 in FIG. 8).

The rotation angle is decided in such a manner that if the second image portion 82 is displayed on the display screen 3 of mobile telephone 1, the part contiguous to the edge portion of the first image portion 81 (display screen 3) in terms of the scrolling direction is displayed first. For example, the rotation angle is 90° if the scrolling direction is the rightward direction, 180° if the scrolling direction is the upward direction, 270° if the scrolling direction is the leftward direction and 0° if the scrolling direction is the downward direction. If the first image portion 81, which is the portion on the left side of the requested image 80, is being displayed on the display screen 3 of mobile telephone 1, as illustrated in FIG. 10, and rightward scrolling is performed in order to display the second image portion 82, which is the portion on the right side of the first image portion 81, on the display screen 3, then the rotation angle of the second image portion 82 will be 90°.

Figure 11:
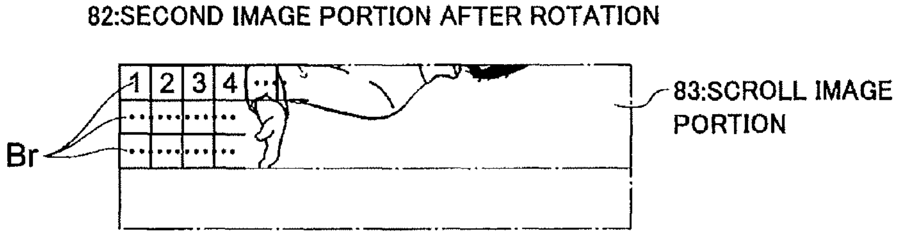
FIG. 11 is an example of a rotated image.

FIG. 11 illustrates the second image portion 82 that has been rotated by 90°.

A scroll image portion 83, which is an area corresponding to the amount of scrolling, is decided from the second image portion 82 that has been rotated through the rotation angle decided. For example, if scrolling has been performed by an amount equivalent to 24 pixels (a 24-pixel scrolling amount), then a scroll image portion 83 having a width of three blocks will be decided.

With reference again to FIG. 8, the second image portion 82 is rotated through the rotation angle decided in the manner described above (step 77). The scroll image portion 83 is decided in accordance with the scrolling amount, partitioning is carried out block by block Br, the blocks Br are read rightward from the upper left and one row at a time, and the image data representing the image within the scroll image portion 83 is compressed one block Br at a time (step 78 in FIG. 8). The image data of scroll image portion 83 that has been compressed one block at a time is transmitted from the image server 40 to the mobile telephone 1 in turn in accordance with the reading order of the blocks Br (step 79 in FIG. 8).

When the compressed image data of the scroll image portion 83 transmitted from the image server 40 is received by the mobile telephone 1 (step 57 in FIG. 6), the compressed image data is expanded (step 58 in FIG. 6). The image portion within the blocks represented by the expanded image data is rotated reversely through the angle by which rotation was performed originally (step 59 in FIG. 6). As a result, the orientation of the scroll image portion 83 is restored to the orientation that prevailed before rotation. When the image data thus rotated in the reverse direction is applied to the display unit 34 of mobile telephone 1, the scroll image portion 83 is displayed on the display screen 3 of mobile telephone 1 (step 60 in FIG. 6).

Figure 12:
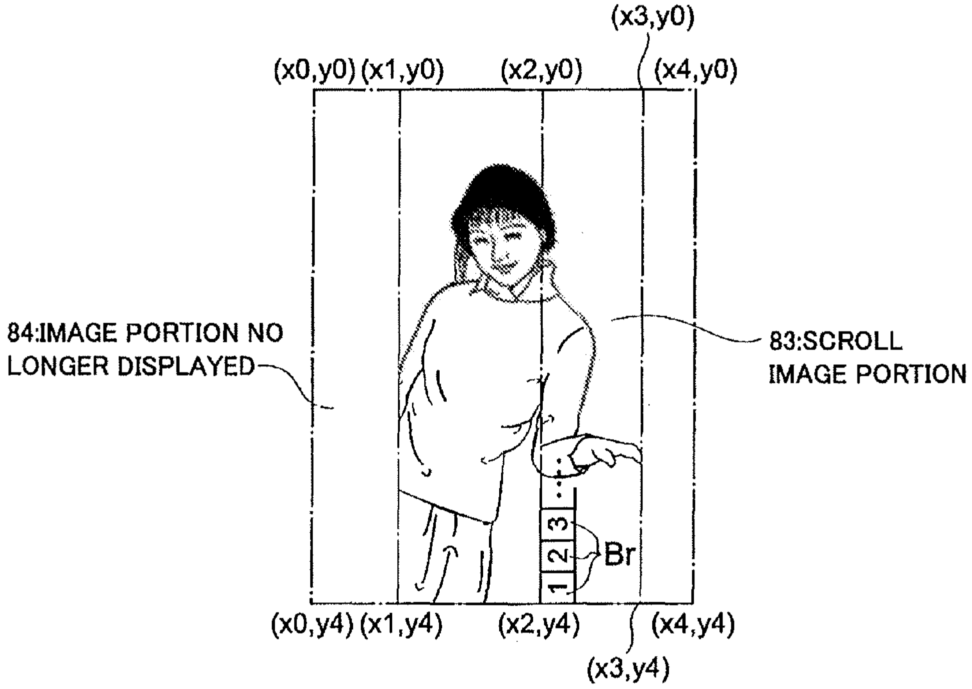
FIG. 12 is an example of an image.

FIG. 12 illustrates the manner in which the scroll image portion 83 is displayed on the display screen 3.

The scroll image portion 83 that was not being displayed before scrolling is now being displayed on the right side of the display screen 3. As described above, the image server 40 compresses the scroll image portion 83 block by block Br in the prescribed order after rotating it by 90°, and the mobile telephone 1 rotates the scroll image portion 83 reversely after expanding it and then displays it block by block Br. The order in which the scroll image portion 83 is displayed is the rightward direction, which is the scrolling direction from the edge portion of the first image portion 81 in terms of the scrolling direction, as indicated by the numerals within the blocks Br.

An image portion 84 [the image portion delimited by coordinates (x0,y0), (x1,y0), (x0,y4) and (x1,y4)] on the left side of the first image portion 81 being displayed on the display screen 3 is no longer displayed owing to scrolling. Thus, an image delimited by coordinates (x1,y0), (x3,y0), (x1,y4) and (x3,y4) that contains the scroll image portion 83 is displayed on the display screen 3.

Figure 13:
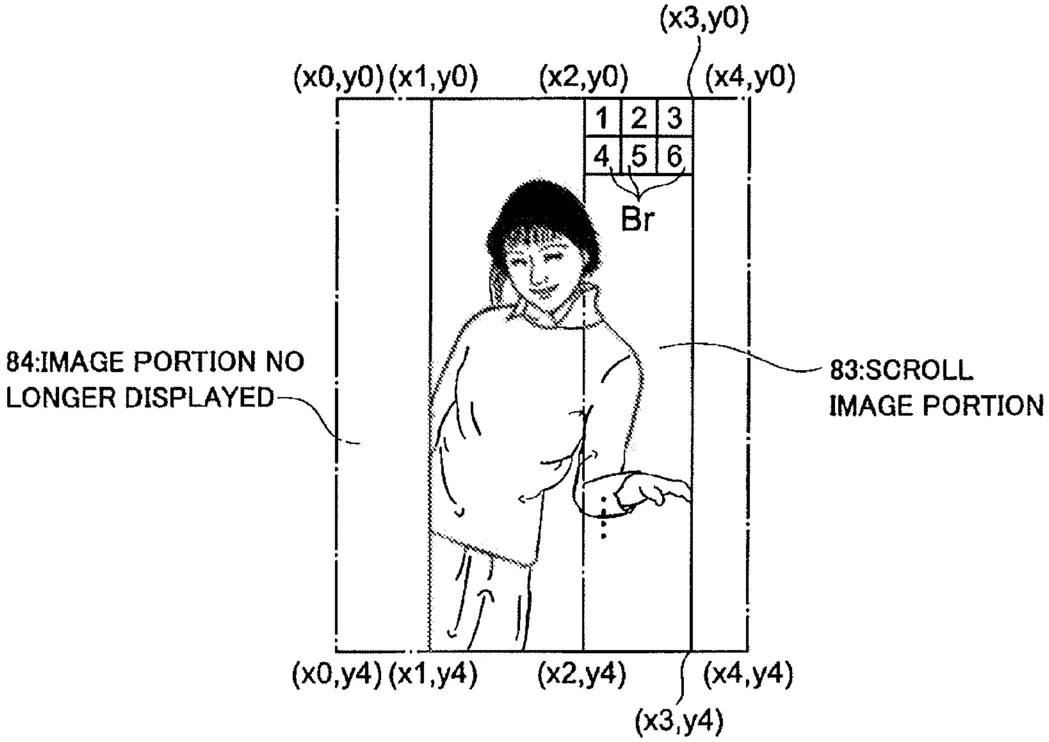
FIG. 13 is an example of an image.

FIG. 13 illustrates the manner in which the image within the blocks Br is read in an order identical with the reading order in the first image portion 81 and is displayed in this order, without rotating the scroll image portion 83 (second image portion 82).

The scroll image portion 83 is displayed in order rightward from the upper left and one row at a time (the block-by-block order of display is indicated by the numerals) in the same order that the first image portion 81 was displayed. The scroll image portion 83 thus is not displayed in a manner similar to the scrolling direction rightward from the left side of scroll image portion 83 contiguous to the first image portion 81.

In the foregoing embodiment, a case where the scrolling direction is the rightward direction is described. However, the scrolling direction is not limited to the rightward direction. In case of the upward direction and leftward direction, rotation is performed in the image server 40 in accordance with the scrolling direction, as described above, and rotation in the reverse direction is performed in the mobile telephone 1. As a result, the scroll image portion 83 is displayed in order from the image edge in the scrolling direction of the image being displayed on the display screen 3. In a case where the scrolling direction is the downward direction, the scroll image portion 83 is displayed in order from the image edge in terms of the scrolling direction of the image being displayed on the display screen 3, without the above-described rotation processing and reverse-rotation processing being executed.

FIGS. 14 to 19 illustrate another embodiment of the present invention.

In the embodiment described above, the second image portion 82 (scroll image portion 83) is rotated in the scrolling direction. In this embodiment, however, the order in which the blocks Br are read is changed in the image server 40 in accordance with the scrolling direction.

Figure 14:
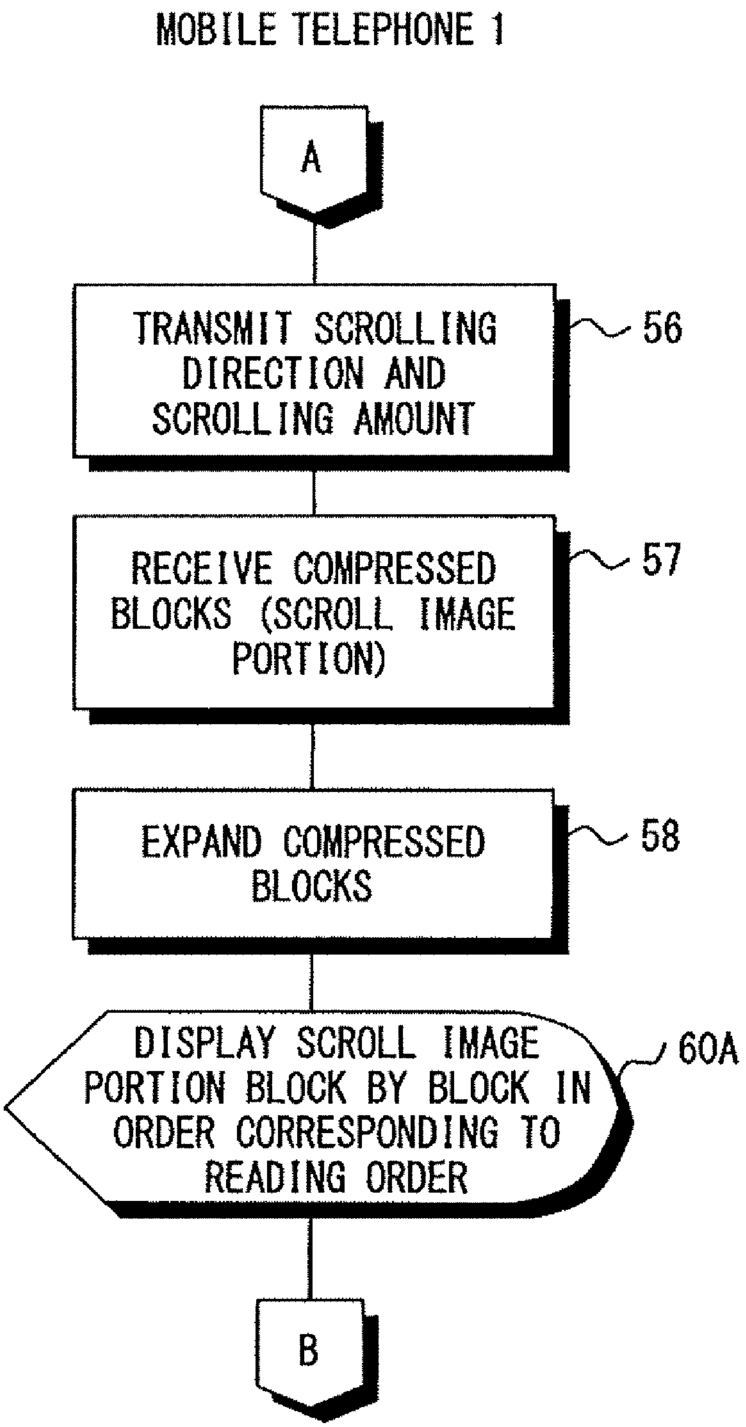
FIG. 14 is a flowchart illustrating a portion of processing executed by a mobile telephone.
Figure 15:
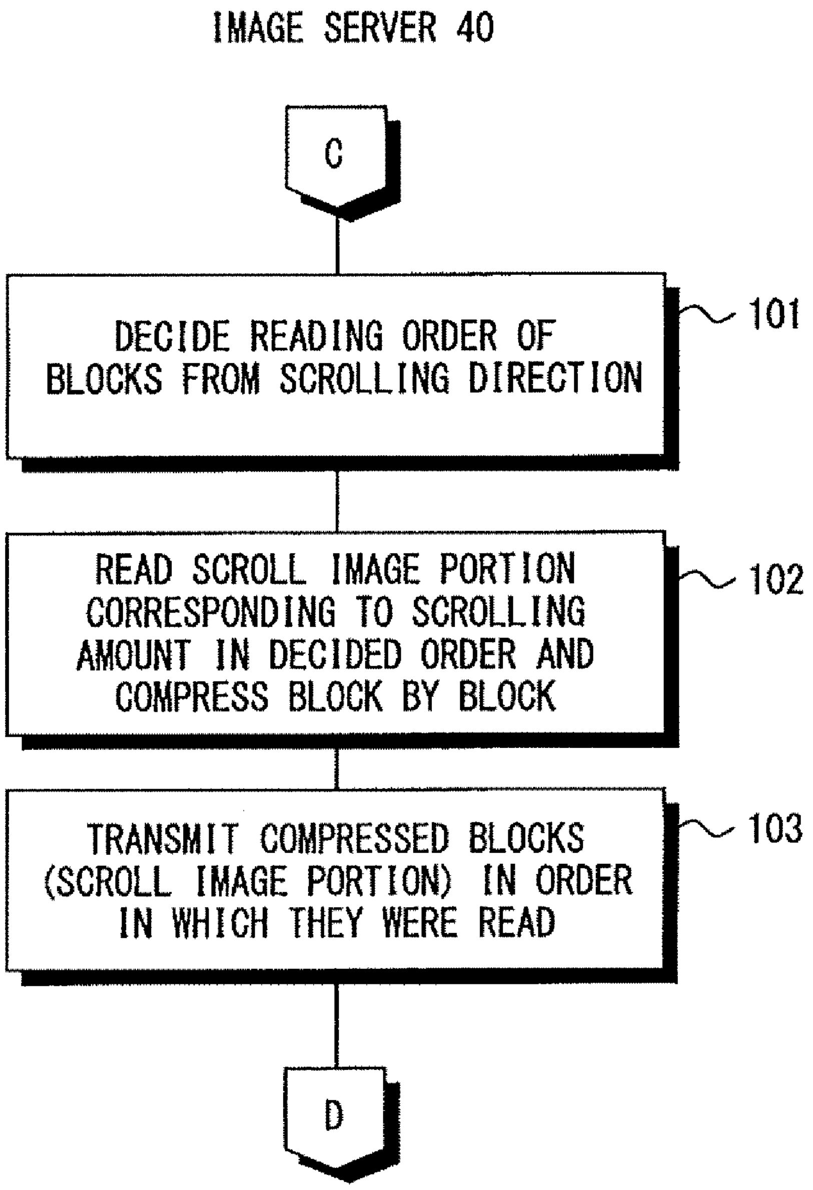
FIG. 15 is a flowchart illustrating a portion of processing executed by an image server.

FIG. 14 is a flowchart illustrating part of the processing executed by the mobile telephone 1 and corresponds to the processing shown in FIG. 6. Processing steps shown in FIG. 14 identical with those in FIG. 6 are designated by like step numbers and need not be described again. FIG. 15 is a flowchart illustrating part of the processing executed by the image server 40 and corresponds to the processing shown in FIG. 8.

When the image on the mobile telephone 1 is scrolled and the image server 40 receives the scrolling direction data and scrolling amount data transmitted from the mobile telephone 1, as described above, the image server 40 decides the reading order of the blocks Br of second image portion 82 from the scrolling direction represented by the scrolling direction data (step 101 in FIG. 15). The order in which the blocks are read is decided in such a manner that a part of the portion of the image not being displayed on the display screen 3 of mobile telephone 1 comes into view, in the scrolling direction, from the image portion contiguous to the edge portion, in terms of the scrolling direction, of the image portion that is being displayed on the display screen 3.

FIGS. 16 to 19 illustrate the order in which the image portion is read block by block Br.

Figure 16:
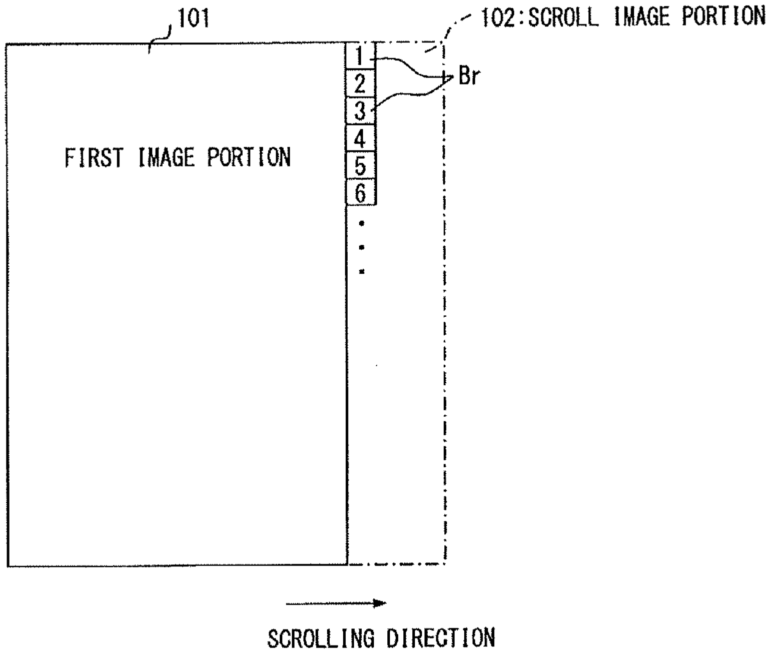
FIG. 16 illustrates block-by-block reading order.

In FIG. 16, assume that a first image portion 101, which forms the left-side portion of the requested image, is being displayed on the display screen 3 of mobile telephone 1. In such case scrolling is performed in the rightward direction in such a manner that the portion on the right side of first image portion 101 being displayed on the display screen 3 comes into view on the display screen 3. A scroll image portion 102 conforming to the amount of scrolling has its reading order decided in such a manner that the image is read block by block Br in order downward from the upper left and rightward one column at a time (the order in which the blocks Br are read is indicated by the numerals).

Figure 17:
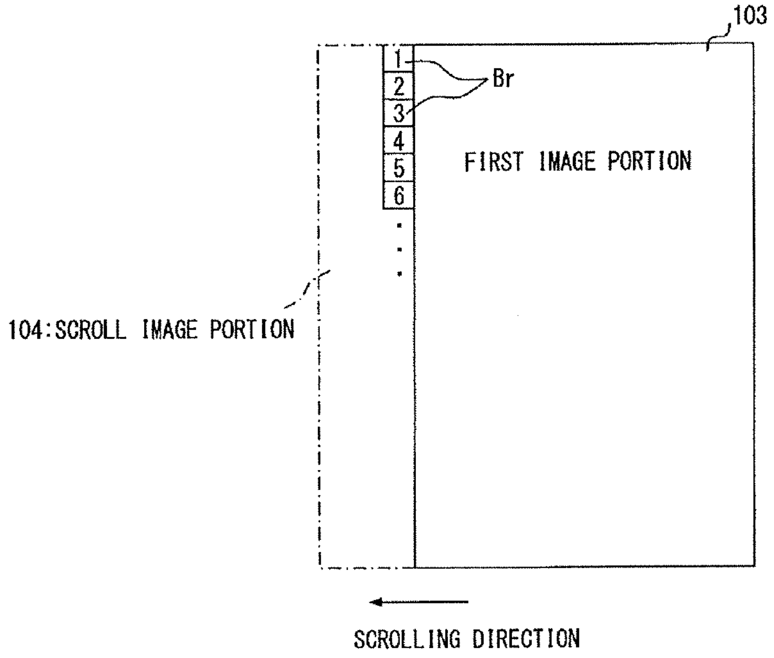
FIG. 17 illustrates block-by-block reading order.

In FIG. 17, assume that a first image portion 103, which forms the right-side portion of the requested image, is being displayed on the display screen 3 of mobile telephone 1. In such case scrolling is performed in the leftward direction in such a manner that the portion on the left side of first image portion 103 being displayed on the display screen 3 comes into view on the display screen 3. A scroll image portion 104 conforming to the amount of scrolling has its reading order decided in such a manner that the image is read block by block Br in order downward from the upper right and leftward one column at a time (the order in which the blocks Br are read is indicated by the numerals).

Figure 18:
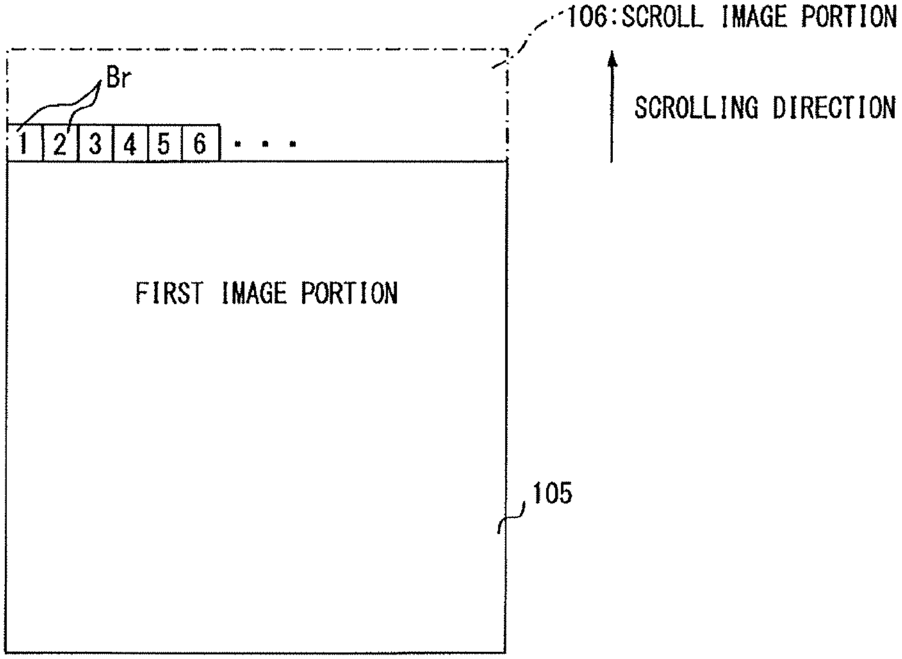
FIG. 18 illustrates block-by-block reading order.

In FIG. 18, assume that a first image portion 105, which forms the lower portion of the requested image, is being displayed on the display screen 3 of mobile telephone 1. In such case scrolling is performed in the upward direction in such a manner that the portion on the upper side of first image portion 105 being displayed on the display screen 3 comes into view on the display screen 3. A scroll image portion 106 conforming to the amount of scrolling has its reading order decided in such a manner that the image is read block by block Br in order rightward from the lower left and upward one row at a time (the order in which the blocks Br are read is indicated by the numerals).

Figure 19:
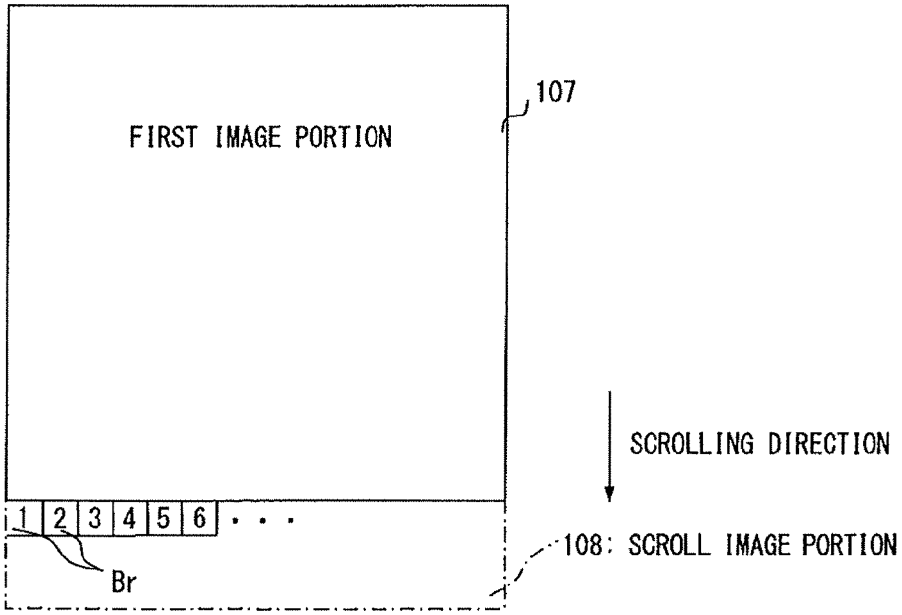
FIG. 19 illustrates block-by-block reading order.

In FIG. 19, assume that a first image portion 107, which forms the upper portion of the requested image, is being displayed on the display screen 3 of mobile telephone 1. In such case scrolling is performed in the downward direction in such a manner that the portion on the lower side of first image portion 107 being displayed on the display screen 3 comes into view on the display screen 3. A scroll image portion 108 conforming to the amount of scrolling has its reading order decided in such a manner that the image is read block by block Br in order rightward from the upper left and downward one row at a time (the order in which the blocks Br are read is indicated by the numerals).

When the block reading order is decided, the scroll image portion corresponding to the scrolling amount is read block by block Br in the reading order decided, and compression is performed block by block Br (step 102 in FIG. 15). The compressed image data of the blocks Br (the scroll image portion data) is transmitted from the image server 40 to the mobile telephone 1 in the order in which the blocks were read (step 103 in FIG. 15).

When the compressed image data transmitted from the image server 40 is received by the mobile telephone 1 (step 57 in FIG. 14), the compressed image data is expanded (step 58 in FIG. 14). The image within the blocks represented by the image data expanded in an order corresponding to the reading order is displayed on the display screen 3 of mobile telephone 1 (step 60A in FIG. 14). Thus the scroll image portion is displayed on the display screen 3. It will be understood that the scroll image portion is displayed in order, along the scrolling direction, from the portion thereof that is contiguous to the first image portion being displayed on the display screen 3, as described above.

As many apparently widely different embodiments of the present invention can be made without departing from the spirit and scope thereof, it is to be understood that the invention is not limited to the specific embodiments thereof except as defined in the appended claims.

What is claimed is:

1. An image server, comprising:

a main image portion data transmitting device for reading, from within a requested image requested by image request data transmitted from a mobile telephone comprising a display device formed to include a display screen, a first image portion of an area, which is displayable on said display screen, when a size of the requested image is larger than a size of the display screen and an entirety of the requested image cannot be displayed, in a prescribed order block by block, where each block comprises a plurality of pixels, and transmitting first image portion data representing said first image portion to the mobile telephone in an order of reading blocks;

a rotation angle deciding device for deciding a rotation angle of a remaining second image portion, which is the requested image minus the first image portion, based upon a scrolling direction represented by scrolling direction data representing a scrolling direction transmitted from the mobile telephone in such a manner that a scroll image portion comes into view in an order along the scrolling direction from an edge portion of the display screen in terms of the scrolling direction;

a rotating device for rotating the second image portion through the rotation angle decided by said rotation angle deciding device; and a scroll image portion data transmitting device for reading a scroll image portion corresponding to a scrolling amount, which is represented by scrolling amount data of the mobile telephone, in a same order as the prescribed order to be applied to the first image portion block by block from within the second image portion that has been rotated by the rotating device, and transmitting scroll image portion data representing the scroll image portion to the mobile telephone in the order of the reading blocks, wherein said rotation angle deciding device:

decides upon 90° as the rotation angle of the second image portion in a case where the scrolling direction represented by the scrolling direction data transmitted from said mobile telephone is rightward;

decides upon 180° as the rotation angle of the second image portion in a case where the scrolling direction represented by the scrolling direction data transmitted from said mobile telephone is upward;

decides upon 270° as the rotation angle of the second image portion in a case where the scrolling direction represented by the scrolling direction data transmitted from said mobile telephone is leftward; and decides upon 0° as the rotation angle of the second image portion in a case where the scrolling direction represented by the scrolling direction data transmitted from said mobile telephone is downward.

2. The image server according to claim 1, wherein, when the size of the requested image is larger than the size of the display screen, the first image portion within the requested image is transmitted to the mobile telephone from the image server.

3. The image server according to claim 2, wherein, when the remaining second image portion, which is not displayed on the display screen, is located in a right side of a display of the first image portion, a scroll command for the rightward is applied to said mobile telephone.

4. The image server according to claim 1, wherein, when the size of the requested image is larger than the size of the display screen, the image server separates the requested image into the first image portion and the remaining second image portion.

5. An image server, comprising:

a main image portion data transmitting device for reading, from within a requested image requested by image request data transmitted from a mobile telephone comprising a display device formed to include a display screen, a first image portion of an area, which is displayable on the display screen, when a size of the requested image is larger than a size of the display screen and an entirety of the requested image cannot be displayed, in a prescribed order block by block, where each block comprises a plurality of pixels, and transmitting first image portion data representing the first image portion to the mobile telephone in an order of reading blocks;

a reading order deciding device for deciding, based upon a scrolling direction represented by scrolling direction data transmitted from the mobile telephone, reading order of the blocks of a scroll image portion corresponding to a scrolling amount represented by scrolling amount data of the mobile telephone in such a manner that the scroll image portion comes into view in an order along the scrolling direction from an edge portion of the display screen in terms of the scrolling direction; and a scroll image portion transmitting device for transmitting scroll image portion data, which represents the scroll image portion, to the mobile telephone block by block in the order decided by said reading order deciding device, wherein a block-by-block reading of the first image portion in the prescribed order is carried out block by block in such a manner that a reading moves rightward from an upper left of the first image portion and downward in turn, and wherein said image server:

decides the block-by-block reading in such a manner that the reading moves downward from an upper left of the scroll image portion and rightward in turn in a case where the scrolling direction represented by the scrolling direction data transmitted from said mobile telephone is rightward;

decides the block-by-block reading in such a manner that the reading moves downward from an upper right of the scroll image portion and leftward in turn in a case where the scrolling direction represented by the scrolling direction data transmitted from said mobile telephone is leftward;

decides the block-by-block reading in such a manner that reading moves rightward from a lower left of the scroll image portion and upward in turn in a case where the scrolling direction represented by the scrolling direction data transmitted from said mobile telephone is upward; and decides the block-by-block reading in an order identical with the prescribed order in a case where the scrolling direction represented by the scrolling direction data transmitted from said mobile telephone is downward.

6. A method of controlling operation of an image server, comprising:

reading, from within a requested image requested by image request data transmitted from a mobile telephone comprises a display device formed to include a display screen, a first image portion of an area, which is displayable on the display screen, when a size of the requested image is larger than a size of the display screen and an entirety of the requested image cannot be displayed, in a prescribed order block by block, where each block comprises a plurality of pixels, and transmitting first image portion data representing the first image portion to the mobile telephone in an order of reading blocks;

deciding a rotation angle of a remaining second image portion, which is the requested image minus the first image portion, based upon a scrolling direction represented by scrolling direction data representing a scrolling direction transmitted from the mobile telephone in such a manner that a scroll image portion comes into view in an order along the scrolling direction from an edge portion of the display screen in terms of the scrolling direction;

rotating the second image portion through the rotation angle decided; and reading a scroll image portion corresponding to a scrolling amount, which is represented by scrolling amount data of the mobile telephone, in a same order as the prescribed order to be applied to the first image portion block by block from within the second image portion that has been rotated, and transmitting scroll image portion data representing the scroll image portion to the mobile telephone in the order of the reading the blocks, wherein said deciding the rotation angle includes:

deciding upon 90° as the rotation angle of the second image portion in a case where the scrolling direction represented by the scrolling direction data transmitted from said mobile telephone is rightward;

deciding upon 180° as the rotation angle of the second image portion in a case where the scrolling direction represented by the scrolling direction data transmitted from said mobile telephone is upward;

deciding upon 270° as the rotation angle of the second image portion in a case where the scrolling direction represented by the scrolling direction data transmitted from said mobile telephone is leftward; and deciding upon 0° as the rotation angle of the second image portion in a case where the scrolling direction represented by the scrolling direction data transmitted from said mobile telephone is downward.

7. A method of controlling operation of an image server, comprising:

reading, from within a requested image requested by image request data transmitted from a mobile telephone comprising a display device formed to include a display screen, a first image portion of an area, which is displayable on the display screen, when a size of the requested image is larger than a size of the display screen and an entirety of the requested image cannot be displayed, in a prescribed order block by block, where each block comprises a plurality of pixels, and transmitting first image portion data representing the first image portion to the mobile telephone in an order of reading blocks;

deciding, based upon a scrolling direction represented by scrolling direction data transmitted from the mobile telephone, reading order of the blocks of a scroll image portion corresponding to a scrolling amount represented by scrolling amount data of the mobile telephone in such a manner that the scroll image portion comes into view in an order along the scrolling direction from an edge portion of the display screen in terms of the scrolling direction; and transmitting scroll image portion data, which represents the scroll image portion, to the mobile telephone block by block in the order decided, wherein a block-by-block reading of the first image portion in the prescribed order is carried out block by block in such a manner that a reading moves rightward from an upper left of the first image portion and downward in turn, and wherein said image server:

decides the block-by-block reading in such a manner that the reading moves downward from an upper left of the scroll image portion and rightward in turn in a case where the scrolling direction represented by the scrolling direction data transmitted from said mobile telephone is rightward;

decides the block-by-block reading in such a manner that the reading moves downward from an upper right of the scroll image portion and leftward in turn in a case where the scrolling direction represented by the scrolling direction data transmitted from said mobile telephone is leftward;

decides the block-by-block reading in such a manner that reading moves rightward from a lower left of the scroll image portion and upward in turn in a case where the scrolling direction represented by the scrolling direction data transmitted from said mobile telephone is upward; and decides the block-by-block reading in an order identical with the prescribed order in a case where the scrolling direction represented by the scrolling direction data transmitted from said mobile telephone is downward.

8. A recording medium storing a computer program, which is readable by an image server, for controlling operation of the image server so as to:

read, from within a requested image requested by image request data transmitted from a mobile telephone comprising a display device formed to include a display screen, a first image portion of an area, which is displayable on the display screen, when a size of the requested image is larger than a size of the display screen and an entirety of the requested image cannot be displayed, in a prescribed order block by block, where each block comprises a plurality of pixels, and transmit first image portion data representing the first image portion to the mobile telephone in an order of reading blocks;

decide a rotation angle of a remaining second image portion, which is the requested image minus the first image portion, based upon a scrolling direction represented by scrolling direction data representing a scrolling direction transmitted from the mobile telephone in such a manner that a scroll image portion comes into view in an order along the scrolling direction from an edge portion of the display screen in terms of the scrolling direction;

rotate the second image portion through the rotation angle decided; and read a scroll image portion corresponding to a scrolling amount, which is represented by scrolling amount data of the mobile telephone, in a same order as the prescribed order to be applied to the first image portion block by block from within the second image portion that has been rotated, and transmit scroll image portion data representing the scroll image portion to the mobile telephone in the order of the reading blocks, wherein said decide the rotation angle:

decides upon 90° as the rotation angle of the second image portion in a case where the scrolling direction represented by the scrolling direction data transmitted from said mobile telephone is rightward;

decides upon 180° as the rotation angle of the second image portion in a case where the scrolling direction represented by the scrolling direction data transmitted from said mobile telephone is upward;

decides upon 270° as the rotation angle of the second image portion in a case where the scrolling direction represented by the scrolling direction data transmitted from said mobile telephone is leftward; and decides upon 0° rotation angle of the second image portion in a case where the scrolling direction represented by the scrolling direction data transmitted from said mobile telephone is downward.

9. A recording medium storing a computer program, which is readable by an image server, for controlling operation of the image server so as to:

read, from within a requested image requested by image request data transmitted from a mobile telephone comprising a display device formed to include a display screen, a first image portion of an area, which is displayable on the display screen, when a size of the requested image is larger than a size of the display screen and an entirety of the requested image cannot be displayed, in a prescribed order block by block, where each block comprises a plurality of pixels, and transmit first image portion data representing the first image portion to the mobile telephone in an order of reading blocks;

decide, based upon a scrolling direction represented by scrolling direction data transmitted from the mobile telephone, reading order of the blocks of a scroll image portion corresponding to a scrolling amount represented by scrolling amount data of the mobile telephone in such a manner that the scroll image portion comes into view in an order along the scrolling direction from an edge portion of the display screen in terms of the scrolling direction; and transmit scroll image portion data, which represents the scroll image portion, to the mobile telephone block by block in the order decided, wherein a block-by-block reading of the first image portion in the prescribed order is carried out block by block in such a manner that a reading moves rightward from an upper left of the first image portion and downward in turn, and wherein said image server:

decides the block-by-block reading in such a manner that the reading moves downward from an upper left of the scroll image portion and rightward in turn in a case where the scrolling direction represented by the scrolling direction data transmitted from said mobile telephone is rightward;

decides the block-by-block reading in such a manner that the reading moves downward from an upper right of the scroll image portion and leftward in turn in a case where the scrolling direction represented by the scrolling direction data transmitted from said mobile telephone is leftward;

decides the block-by-block reading in such a manner that reading moves rightward from a lower left of the scroll image portion and upward in turn in a case where the scrolling direction represented by the scrolling direction data transmitted from said mobile telephone is upward; and decides the block-by-block reading in an order identical with the prescribed order in a case where the scrolling direction represented by the scrolling direction data transmitted from said mobile telephone is downward.

* * * * *